Aug. 9, 1932.  E. BERNSTEIN  1,870,600
COMBINED HEATING AND COOKING STOVE

Filed Oct. 7, 1930

INVENTOR
EDWARD BERNSTEIN
BY
ATTORNEY

Patented Aug. 9, 1932

1,870,600

UNITED STATES PATENT OFFICE

EDWARD BERNSTEIN, OF NEW YORK, N. Y.

COMBINED HEATING AND COOKING STOVE

Application filed October 7, 1930. Serial No. 487,013.

This invention relates to heaters and has for its object to provide a combined heater and cooking stove.

A further object of the invention is to provide an attachment for gas heaters whereby the same may be converted into a cooker.

A still further object of the invention is to provide in combination with a gas or other heater, an attachment pivotally connected to the heater which may be swung back behind the heater and entirely out of view when not in use.

With the above and such other objects in view as may hereinafter more fully appear, I have invented the device shown in the accompanying drawing, in which.

Figure 1:
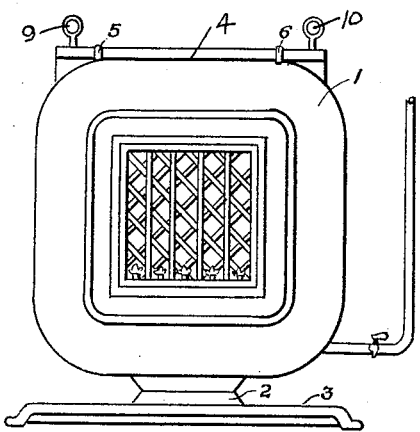
Figure 1 is a front elevational view of a heater embracing my invention, shown in position as a heater.

Like reference characters indicate like parts throughout the following specification, and in the several views in the drawing in which 1 indicates a gas stove, or heater, which may be of the type known as "Radiant Fire" or the like, mounted upon a pedestal 2, supported upon a base 3, and so formed that it may be set out into the room.

Figure 4:
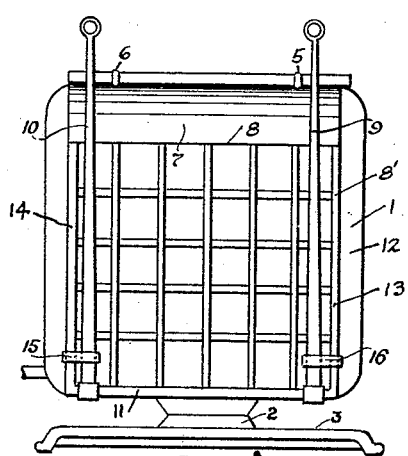
Figure 4 is a rear elevational view of the heater showing the cooker folded onto the back of the heater and in inoperative position.
Figure 5:
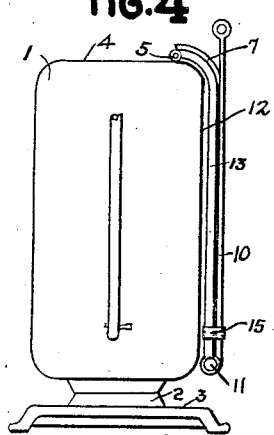
Figure 5 is a side view of Figure 1.

Hingedly mounted upon the top wall 4 of said heater by means of eyes 5 and 6 or other suitable means is a deflector member 7 to the longitudinal edge 8 of which is fixed a grid 8' having legs 9 and 10 hingedly connected to its forward or free edge 11 whereby when the grid is swung over against the back 12 of the heater, as indicated in Figure 4, the said legs 9 and 10 may be swung upwardly to lie flat against the grid 8 whereupon the cooking grid will be entirely hidden from view by the heater, as indicated in Figure 5. The side frames 13 and 14 are provided with springs 15 and 16, adapted to bear frictionally against the legs 9 and 10 in their folded position, whereby said legs will be held against accidental displacement from said position. The deflector 7 will cause the heat arising from said heater to flow out under the grid and prevent its escape directly up. The size of the grid is such that a number of cooking vessels and utensils may be readily placed thereon and the caloric from the heater may, in this way, be utilized for both heating and cooking purposes.

Figure 2:
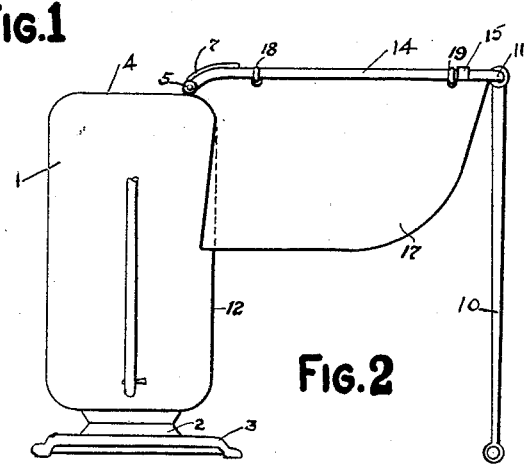
Figure 2 is a side elevational view thereof, but shown as a cooker.
Figure 3:
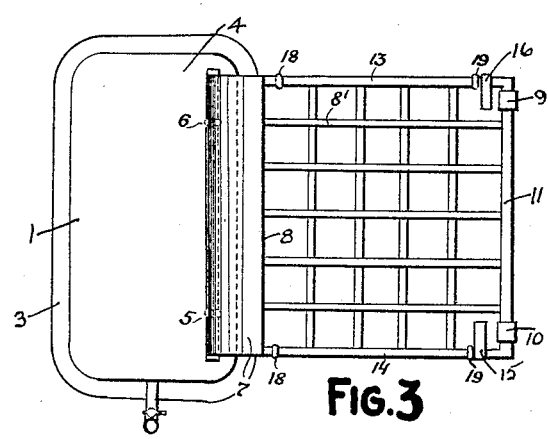
Figure 3 is a top plan view thereof.

If desired, aprons 17 (only shown in Figs. 2 and 3) may be suspended from the said members 13 and 14 by means of hooks 18 and 19 whereby the heat may be more closely confined directly under the grid.

Having described my invention that which I claim to be new and desire to procure by Letters Patent is:

1. In a combined heating and cooking stove, a heater having a horizontal top connected by a convexed curve with a vertical back, a grid hinged on said top and extending around said curve and down the back, and legs hinged on the free end of the grid and of lengths to support the grid in a horizontal position above said horizontal top of the heater and capable of being folded flat against the grid when the grid is in position against the back of said heater.

2. In a combined heating and cooking stove, a heater having a horizontal top connected by a convexed curve with a vertical back, a grid hinged on said top and extending around said curve and down the back, legs hinged on the free end of the grid and of lengths to support the grid in a horizontal position above said horizontal top of the heater and capable of being folded flat against the grid when the grid is in position against the back of said heater, and a curved deflector extending from the hinged point of said grid around the curved portion thereof.

3. In a combined heating and cooking stove, a heater having a horizontal top connected by a convexed curve with a vertical back, a grid hinged on said top and extending around said curve and down the back, legs hinged on the free end of the grid and of lengths to support the grid in a horizontal position above said horizontal top of the heater and capable of being folded flat against the grid when the grid is in position against the back of said heater, a curved deflector extending from the hinged point of said grid around the curved portion thereof, and aprons on the side of said grid coactable with said curved deflector to form a channel passage for heated air from the heater.

EDWARD BERNSTEIN.